United States Patent
Park et al.

(10) Patent No.: US 10,777,994 B2
(45) Date of Patent: Sep. 15, 2020

(54) DISPLAY DEVICE INCLUDING LEVEL SHIFTER AND METHOD OF OPERATING THE SAME

(71) Applicant: LG Display Co., Ltd., Seoul (KR)

(72) Inventors: Min-Gyu Park, Seoul (KR); Seong-Heon An, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 122 days.

(21) Appl. No.: 16/103,170

(22) Filed: Aug. 14, 2018

(65) Prior Publication Data

US 2019/0081471 A1 Mar. 14, 2019

(30) Foreign Application Priority Data

Sep. 14, 2017 (KR) .......................... 10-2017-0117843

(51) Int. Cl.
*H02H 3/08* (2006.01)
*G02F 1/1345* (2006.01)
(Continued)

(52) U.S. Cl.
CPC ........... *H02H 3/08* (2013.01); *G02F 1/13454* (2013.01); *G02F 1/136204* (2013.01);
(Continued)

(58) Field of Classification Search
CPC combination set(s) only.
See application file for complete search history.

(56) References Cited

U.S. PATENT DOCUMENTS

2007/0247774 A1 10/2007 Cheng et al.
2008/0231219 A1* 9/2008 Mori .................... H02P 3/22
318/434
(Continued)

FOREIGN PATENT DOCUMENTS

JP 2008-236983 A 10/2008
JP 2014-016577 A 1/2014
KR 10-2015-0081867 A 7/2015

OTHER PUBLICATIONS

Notice of Reason for Refusal dated Jul. 30, 2019, issued in corresponding Japanese Patent Application No. 2018-164979.

*Primary Examiner* — Temesghen Ghebretinsae
*Assistant Examiner* — Sosina Abebe
(74) *Attorney, Agent, or Firm* — Morgan, Lewis & Bockius LLP

(57) ABSTRACT

A display device includes: a timing controller generating and supplying first timing control signals, a level shifter generating and supplying gate control signals using the first timing control signals, a gate driver separately driving gate lines of a panel using the gate control signals, and an output circuit outputting the gate control signals, the level shifter including an overcurrent protection circuit (OPC) connected to the output circuit, the overcurrent protection circuit sensing overcurrent generation in the level shifter and overcurrent generation in a target circuit through the output circuit to output an overcurrent protection signal, wherein the level shifter: sets a time period to be a non-sensing time period, turns off a sensing operation of the OPC during the non-sensing time period, and turning on the sensing operation of the OPC during other periods, and wherein the OPC: turns on the sensing operation, and senses the overcurrent generation.

20 Claims, 14 Drawing Sheets

(51) Int. Cl.
*G09G 5/00* (2006.01)
*G02F 1/1362* (2006.01)
*G09G 3/00* (2006.01)
*G09G 3/36* (2006.01)
*G09G 3/3266* (2016.01)

(52) U.S. Cl.
CPC ............ *G09G 3/00* (2013.01); *G09G 3/3266* (2013.01); *G09G 3/3674* (2013.01); *G09G 5/006* (2013.01); *G09G 2310/0267* (2013.01); *G09G 2310/0289* (2013.01); *G09G 2310/08* (2013.01); *G09G 2320/0252* (2013.01)

(56) References Cited

U.S. PATENT DOCUMENTS

2014/0016240 A1* 1/2014 Kawata ................ H02H 3/0935
361/95
2015/0194800 A1 7/2015 Kim et al.

\* cited by examiner

<CLK OUTPUT: NORMAL OUTPUT WAVEFORM>

<CLK OUTPUT: SHORT OCCURS>

DISPLAY DEVICE INCLUDING LEVEL SHIFTER AND METHOD OF OPERATING THE SAME

CROSS-REFERENCE TO RELATED APPLICATION(S)

This application claims the benefit of and priority to Korean Patent Application No. 10-2017-0117843, filed on Sep. 14, 2017, the entirety of which is hereby incorporated by reference.

BACKGROUND

1. Technical Field

The present disclosure relates to a display device for sensing generation of overcurrent therein and other circuits through a level shifter to protect an entire circuit, and a method of operating the same.

2. Discussion of the Related Art

Recently, representative examples of a display device for displaying an image using digital data include a liquid crystal display (LCD) using liquid crystal, an organic light-emitting diode (OLED) display using an OLED, and an electrophoretic display (EPD) using electrophoretic particles. A display device includes a panel for displaying an image through a pixel array in which pixels are independently driven by thin film transistors (TFTs), respectively, a gate driver and data driver for driving the panel, a timing controller for controlling driving of the gate driver and the data driver, and so on.

A gate driver has employed a gate-in-panel (GIP)-type method in which the gate driver is formed and built in a panel along with a TFT array of a pixel array. A level shifter is positioned between a timing controller and the GIP-type built-in gate driver. The level shifter generates a plurality of gate control signals using a plurality of simple (or first) timing control signals received from the timing controller, shifts each voltage level of the generated signals, and supplies the level-shifted signals to the built-in gate driver.

However, overcurrent may be generated in the panel or the built-in gate driver for reasons, such as a short circuit and a circuit device in the panel, as well as that the gate driver may be fatally damaged, for example, the circuit device in the panel as well as the gate driver combusts or the panel ignites due to the generated overcurrent. To overcome this problem, there is a need for an overcurrent protection (OCP) circuit for sensing overcurrent generated in the built-in gate driver, the panel, and so on to protect a display device. In particular, the OCP circuit needs to differentially sense peak current generated via normal driving and overcurrent (short current), for example, due to a short circuit, to ensure reliability.

SUMMARY

Accordingly, the present disclosure is directed to a display device including a level shifter and a method of operating the same that substantially obviate one or more of the issues due to limitations and disadvantages of the related art.

An aspect of the present disclosure is to provide a display device for sensing generation of overcurrent therein and other circuits through a level shifter to protect an entire circuit.

Another aspect of the present disclosure is to provide a display device for differentially sensing peak current generated via normal driving and overcurrent, e.g., due to a short circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display device, including: a timing controller configured to generate and supply a plurality of first timing control signals, a level shifter configured to generate and supply a plurality of gate control signals using the plurality of first timing control signals received from the timing controller, a gate driver configured to separately drive gate lines of a panel using the plurality of gate control signals received from the level shifter, and an output circuit configured to output of the plurality of gate control signals, wherein the level shifter includes an overcurrent protection circuit connected to the output circuit, the overcurrent protection circuit being configured to sense overcurrent generation in the level shifter and overcurrent generation in a target circuit, directly or indirectly connected to the level shifter, through the output circuit to output an overcurrent protection signal, wherein the level shifter is further configured to: set a time period in which normal peak current is generated by output of each of the plurality of gate control signals, to be a non-sensing time period, turn off a sensing operation of the overcurrent protection circuit during the non-sensing time period, and turn on the sensing operation of the overcurrent protection circuit during remaining periods, except for the non-sensing time period, and wherein the overcurrent protection circuit is further configured to: turn on the sensing operation, and sense the overcurrent generation during a predetermined sensing time period.

In another aspect, there is provided a method of operating a display device, the method including: by a timing controller, generating and supplying a plurality of first timing control signals, by a level shifter, generating and supplying a plurality of gate control signals using the plurality of first timing control signals received from the timing controller, by a gate driver, separately driving gate lines of a panel using the plurality of gate control signals received from the level shifter, and by an output circuit, outputting the plurality of gate control signals, wherein the level shifter includes an overcurrent protection circuit connected to the output circuit, the overcurrent protection circuit sensing overcurrent generation in the level shifter and overcurrent generation in a target circuit, directly or indirectly connected to the level shifter, through the output circuit to output an overcurrent protection signal, by the level shifter: setting a time period in which normal peak current is generated by output of each of the plurality of gate control signals, to be a non-sensing time period, turning off a sensing operation of the overcurrent protection circuit during the non-sensing time period, and turning on the sensing operation of the overcurrent protection circuit during remaining periods, except for the non-sensing time period, and by the overcurrent protection circuit: turning on the sensing operation, and sensing the overcurrent generation during a predetermined sensing time period.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
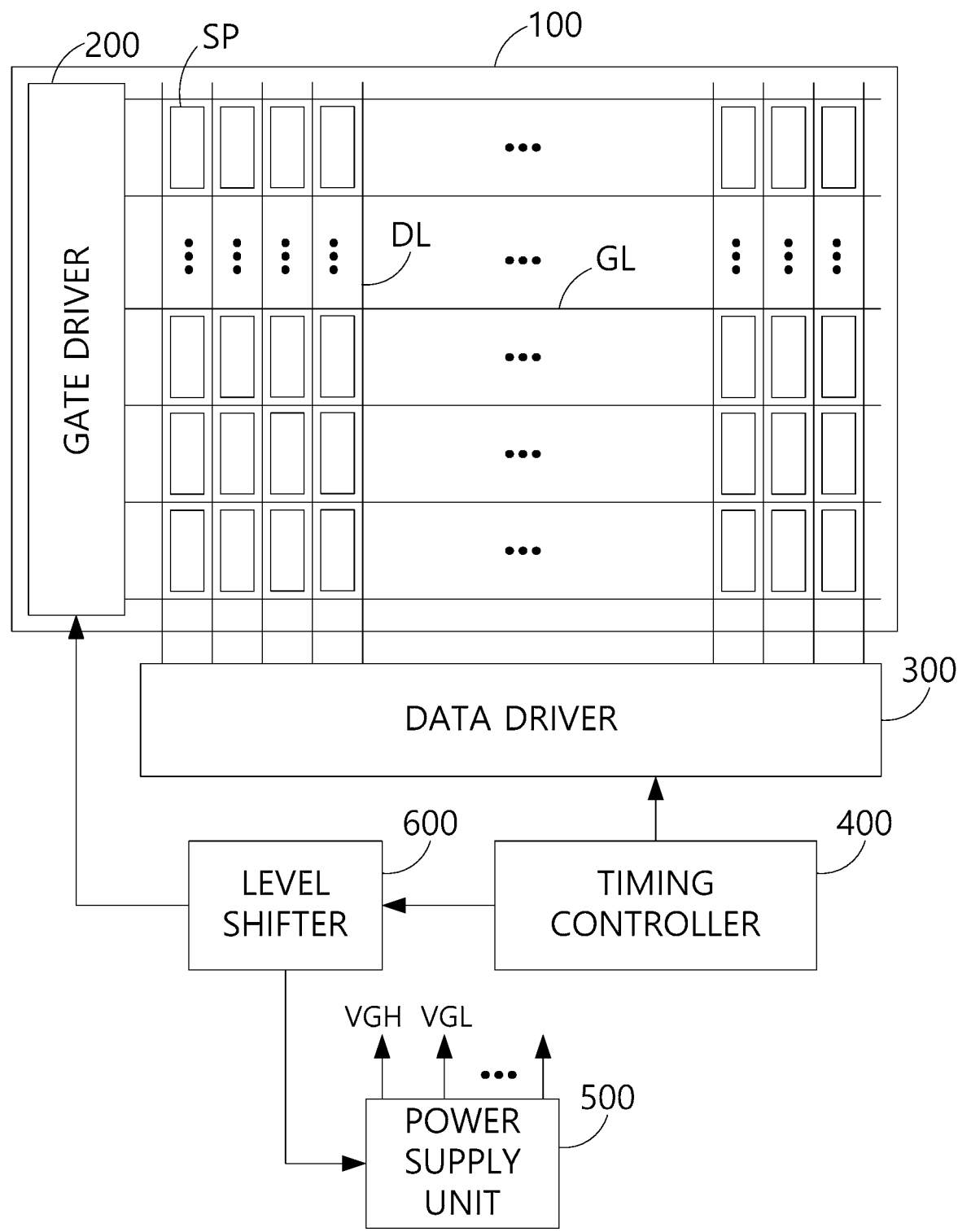
FIG. 1 is a block diagram showing a configuration of a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a display apparatus according to an embodiment of the present disclosure will be described in detail with reference to the accompanying drawings. In adding reference numerals to elements of each of the drawings, although the same elements are illustrated in other drawings, like reference numerals may refer to like elements.

Figure 2:
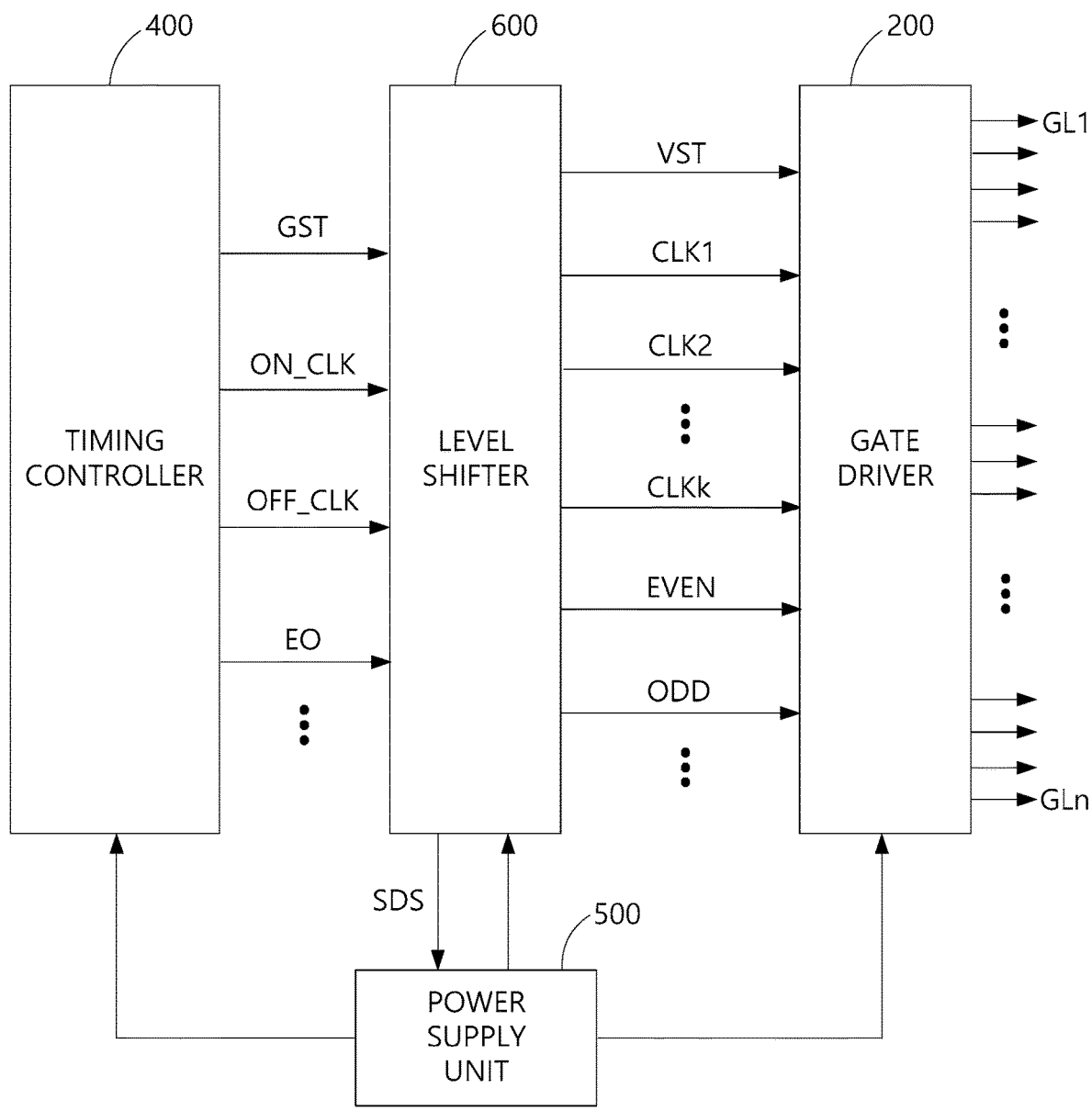
FIG. 2 is a diagram showing an example of a signal connection relationship between a level shifter and other circuit blocks according to an example embodiment of the present disclosure.
Figure 3:
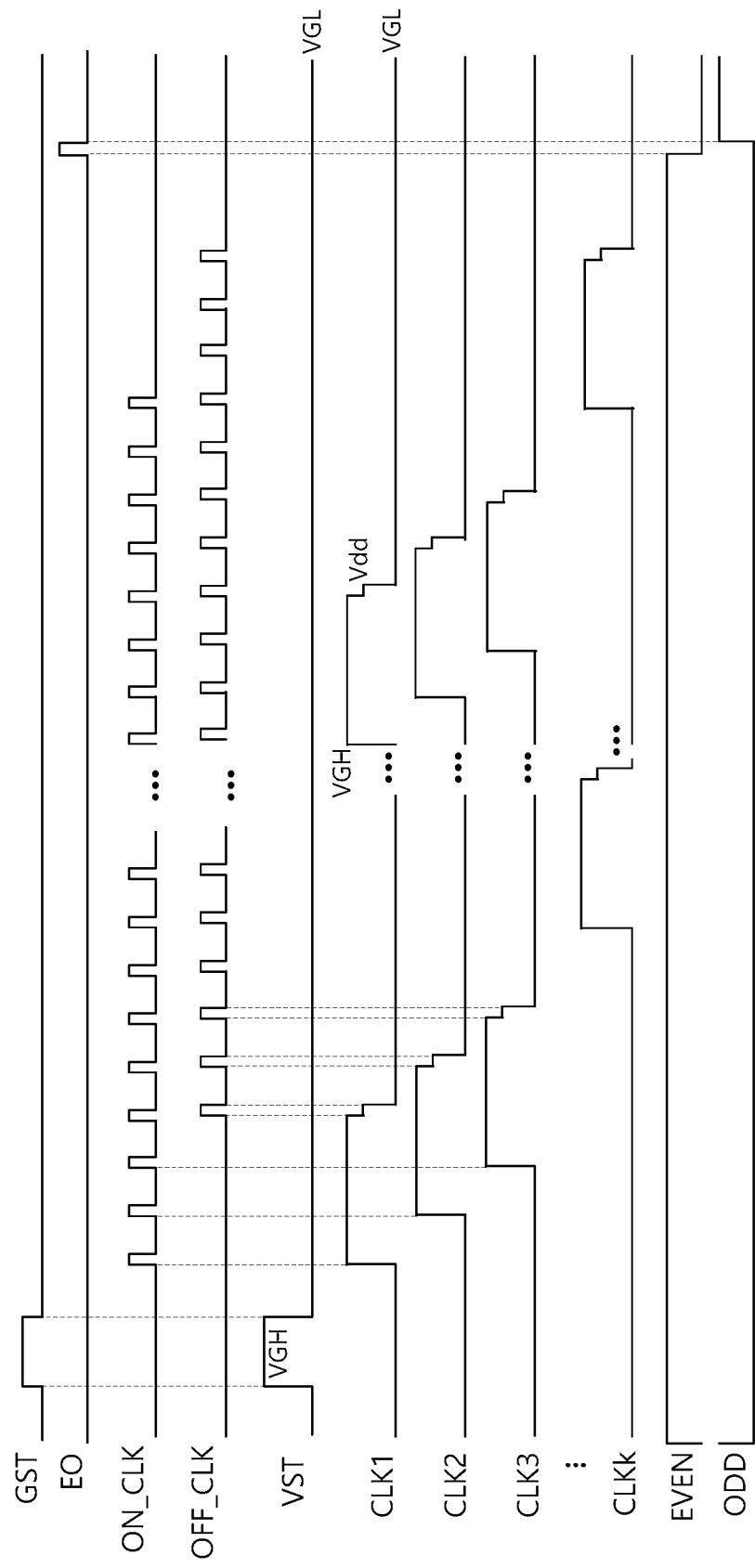
FIG. 3 is a waveform diagram showing an example of input and output signals of a level shifter according to an example embodiment of the present disclosure.

FIG. 1 is a block diagram showing a configuration of a display device according to an example embodiment of the present disclosure. FIG. 2 is a diagram showing an example of a signal connection relationship between a level shifter and other circuit blocks according to an example embodiment of the present disclosure. FIG. 3 is a waveform diagram showing an example of input and output signals of a level shifter according to an example embodiment of the present disclosure.

With reference to FIG. 1, a display device may include a timing controller 400, a level shifter 600, a gate driver 200, a data driver 300, a panel 100, a power supply 500, and so on. The panel 100 may display an image through a pixel array in which subpixels SPs, each connected to a gate line GL and a data line DL, may be arranged in a matrix. A basic pixel may include at least three subpixels being capable of realizing white by color mixture among white W, red R, green G, and blue B subpixels. For example, the basic pixel may include subpixels of an R/G/B combination, subpixels of a W/R/G combination, subpixels of a B/W/R combination, and subpixels of a G/B/W combination, or may include subpixels of a W/R/G/B combination. Embodiments are not limited these examples.

The panel 100 may be various display panels, such as a liquid crystal display (LCD) panel or an organic light-emitting diode (OLED) panel. The panel 100 may be a display panel for touch combined use that also has a touch sensing function.

The gate driver 200 may separately drive gate lines GLs of the panel 100 using a plurality of gate control signals received from the level shifter 600. The gate driver 200 may supply a scan pulse with a gate on voltage, for example, a gate high voltage VGH in a scan period in which a corresponding gate line GL is driven, and may supply a gate off voltage, for example, a gate low voltage VGL in a non-scan period in which a corresponding gate line GL is not driven.

The gate driver 200 may be configured in a gate-in-panel (GIP)-type method in which the gate driver is formed on a thin film transistor substrate along with a thin film transistor array included in a pixel array of the panel 100, and may built in a non-active area of the panel 100. The gate driver 200 may include a plurality of gate integrated circuits (ICs), and may be separately installed in a circuit film, such as a chip-on-film (COF) to be bonded to the panel 100 using a tape automated bonding (TAB) method, or may be installed on the panel 100 using a chip-on-glass (COG) method.

The data driver 300 may convert image data received from the timing controller 400 into analog signals, and may supply the analog signals to data lines DLs of the panel 100 in response to data control signals received from the timing controller 400. The data driver 300 may subdivide reference gamma voltages received from a gamma voltage generation unit (e.g., circuit) (not shown), which may be installed in the data driver 300 or may be separately included outside the data driver 300, into grayscale voltages corresponding to grayscale values of data, respectively. The data driver 300 may convert digital data into an analog data voltage using the subdivided grayscale values and supply the data voltage to each of the data lines DLs of the panel 100.

When the panel 100 is an OLED panel, the data driver 300 may further include a sensing unit (e.g., circuit) for sensing pixel current having electrical characteristics of each subpixel SP as a voltage and providing the sensing data to the timing controller 400. The data driver 300 may include a plurality of data ICs, and may be installed in a circuit film such as a COF to be bonded to the panel 100 using a TAB method, or may be installed in the panel 100 using a COG method.

The timing controller 400 may receive image data and base timing control signals from a system. The system may be any one of systems of portable terminals, such as a computer, a television (TV) system, a set top box, a tablet, or a portable phone. Embodiments are not limited to these example devices. The base timing control signals may include a dot clock, a data enable signal, a vertical synchronization signal, a horizontal synchronization signal, and so on. The timing controller 400 may perform various image processing operations, such as luminance correction or image quality correction on the image data received from the system, and may supply the image data to the data driver 300.

The timing controller 400 may generate data control signals for control of driving timing of the data driver 300, and may supply the data control signals to the data driver 300 using the base timing control signals received from the system and timing setting information (start timing, pulse width, etc.) stored in an internal register. For example, the plurality of data control signals may include a source start pulse used to control latch timing of data, a source sampling clock, a source output enable signal for control of an output time period of a data signal, and so on. The timing controller 400 may generate a plurality of simple (or first) timing control signals as a reference, for generation of a plurality of gate control signals by the level shifter 600, using the simple (or first) timing control signals received from the system and internal timing setting information, and may supply the simple (or first) timing control signals to the level shifter 600.

The power supply 500 may generate and output various driving voltages for control of all circuit components of the display device, e.g., the timing controller 400, the level shifter 600, the gate driver 200, the data driver 300, the panel 100, etc., using an input voltage received from the outside. For example, the power supply 500 may generate and output a digital driving voltage supplied to the timing controller 400, the data driver 300, the level shifter 600, etc., an analog driving voltage supplied to the data driver 300, a gate on voltage VGH and a gate off voltage VGL supplied to the gate driver 200 and the level shifter 600, a driving voltage required for control of the panel 100, and so on using the input voltage.

The level shifter 600 may generate the plurality of gate control signals using the plurality of simple (or first) timing control signals received from the timing controller 400, may perform level shifting on the gate control signals, and may supply the level-shifted gate control signals to the gate driver 200.

With reference to FIGS. 2 and 3, the timing controller 400 may generate a plurality of simple (or first) timing control signals CSs, that is, on clock ON_CLK, off clock OFF_CLK, a gate start pulse GST, an even/odd control pulse EO, etc., and may supply the simple (or first) timing control signals CSs to the level shifter 600. The timing controller 400 may further supply a reset signal, etc. to the level shifter 600.

The level shifter 600 may perform level shifting on the gate start pulse GST received from the timing controller 400 to an output start pulse VST, and may supply the output start pulse VST to the gate driver 200. The level shifter 600 may shift high and low levels of the gate start pulse GST to a gate high voltage VGH and a gate low voltage VGL of the output start pulse VST, respectively. The output start pulse VST may indicate start of a shift operation of the gate driver 200 for each frame. The level shifter 600 may perform level shifting on a reset pulse, etc. received from the timing controller 400, and may supply the level-shifted reset pulse, etc. to the gate driver 200.

The level shifter 600 may perform a logic operation on the on clock ON_CLK and the off clock OFF_CLK, received from the timing controller 400, to generate k-phase clocks CLK1 to CLKk, phases of which may be sequentially shifted, and supply the k-phase clocks CLK1 to CLKk to the gate driver 200. With reference to FIG. 3, a rising time at which each of the k-phase clocks CLK1 to CLKk rises to a gate high voltage VGH from a gate low voltage VGL may be determined according to a rising time of each of the plurality of on clocks ON_CLKs. A falling time at which each of the k-phase clocks CLK1 to CLKk falls to an intermediate voltage Vdd from the gate high voltage VGL may be determined according to a rising time of each of a plurality of off clocks OFF_CLKs with a phase difference from on clocks ON_CLKs, and a falling time at which each of the clocks CLK1 to CLKk falls to the gate low voltage VGL from the intermediate voltage Vdd may be determined according to a falling time of each off clock OFF_CLK. Each of the k-phase clocks CLK1 to CLKk may overlap with an adjacent clock in some high periods.

The level shifter 600 may determine phase inversion timing of the even alternating current (AC) voltage EVEN and the odd AC voltage ODD in response to the even/odd control pulse EO received from the timing controller 400, may invert phases of the even AC voltage EVEN and the odd AC voltage ODD at the determined phase inversion timing, and may supply the voltages to the gate driver 200. The even AC voltage EVEN and the odd AC voltage ODD may be used as a driving voltage of TFTs that may be alternately driven in an even frame and an odd frame in the gate driver 200. The gate driver 200 may start a shift operation in response to the start pulse VST received from the level shifter 600, may sequentially and alternately select the k-phase clocks (CLK1 to CLKk), and may output the selected clock to the gate lines GL1 to GLn as a scan signal.

For example, the level shifter 600 may further include an overcurrent protection (OCP) circuit for sensing generation of overcurrent of each of a plurality of output channels of an output unit (e.g., circuit) to protect circuit devices from the overcurrent. The level shifter 600 may further include a circuit for adjusting and setting sensing current and sensing time for sensing overcurrent by the OCP circuit. The level shifter 600 may set a period in which peak current of a normal signal may be generated, as a non-sensing time period, and may turn off a sensing operation of the OCP circuit during the non-sensing time period using an input and output signal. Accordingly, the OCP circuit may be operated only in a sensing time period, which is not the non-sensing time period, to differentially sense generation of overcurrent from the normal peak current and to output an overcurrent protection signal (hereinafter referred to as an OCP signal) whenever generation of overcurrent is sensed.

Accordingly, the level shifter 600 may differently sense, not only generation of overcurrent therein, but also overcurrent generated for reasons, such as a short circuit in circuit components electrically connected to the level shifter 600, e.g., a printed circuit board (PCB), the gate driver 200 installed in the panel 100, etc., as well as overcurrent, from peak current of a normal signal. Thus, the level shifter 600 may prevent the OCP circuit from malfunctioning due to the peak current of the normal signal.

The level shifter 600 may supply a shutdown signal (SDS) to the power supply 500. Thus, the power supply 500 may block the entire power supply to protect the entire display device from overcurrent when a number of times of outputting an OCP signal generated by an OCP circuit of at least one output channel is equal to or greater than a set value.

Figure 4:
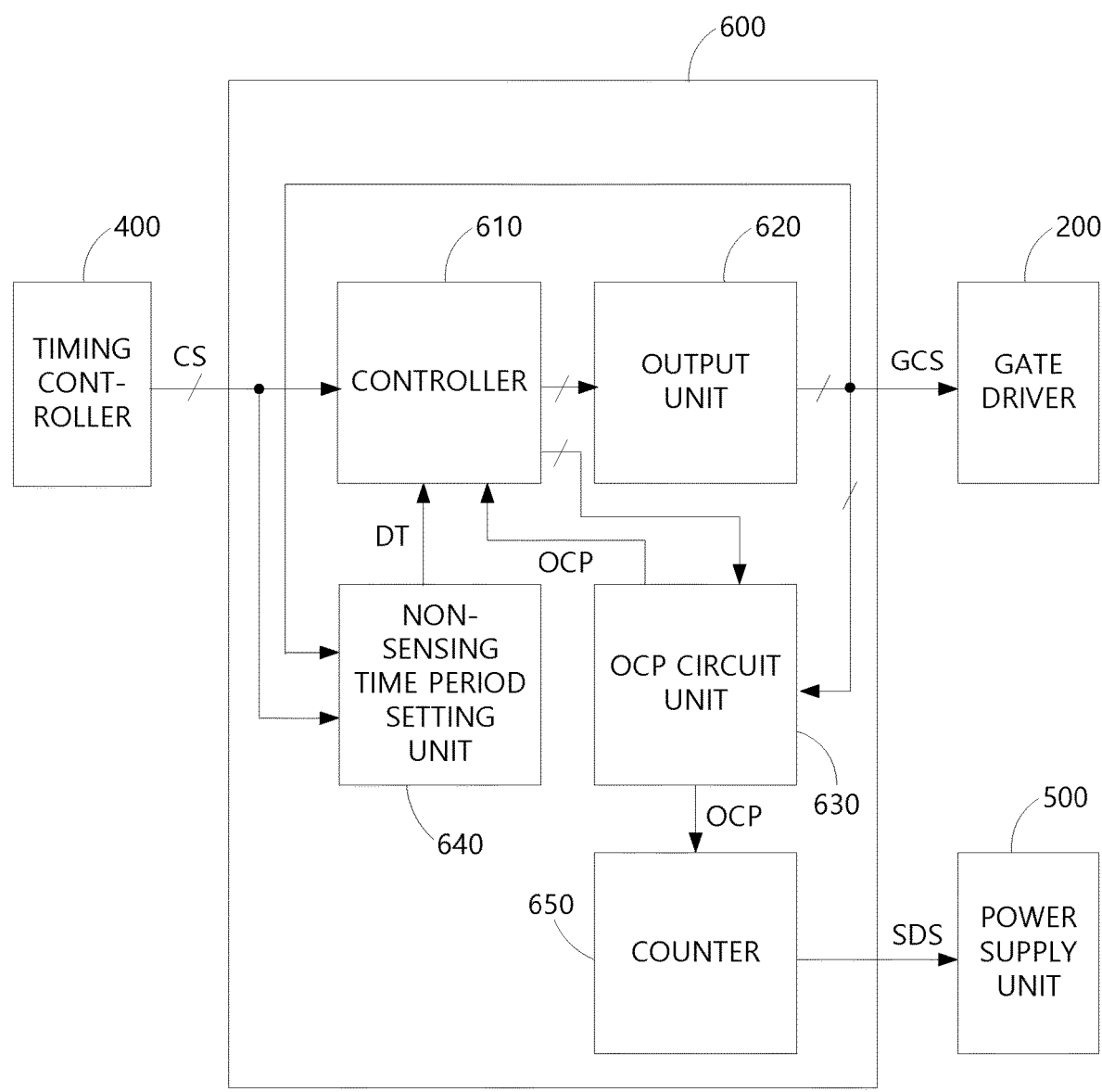
FIG. 4 is a circuit block diagram showing an internal configuration of a level shifter according to an example embodiment of the present disclosure.
Figure 5A:
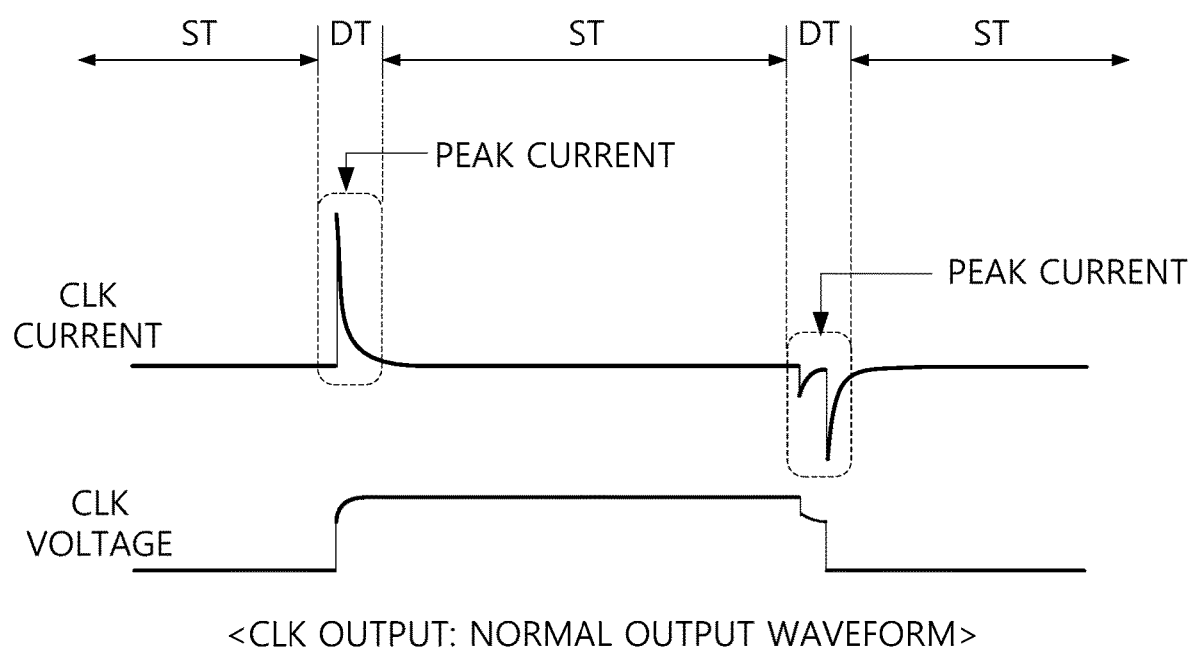
FIGS. 5A and 5B are simulation waveform diagrams showing a comparison between normal peak current in a non-sensing time period and overcurrent in a sensing time period in a level shifter according to an example embodiment of the present disclosure.
Figure 5B:
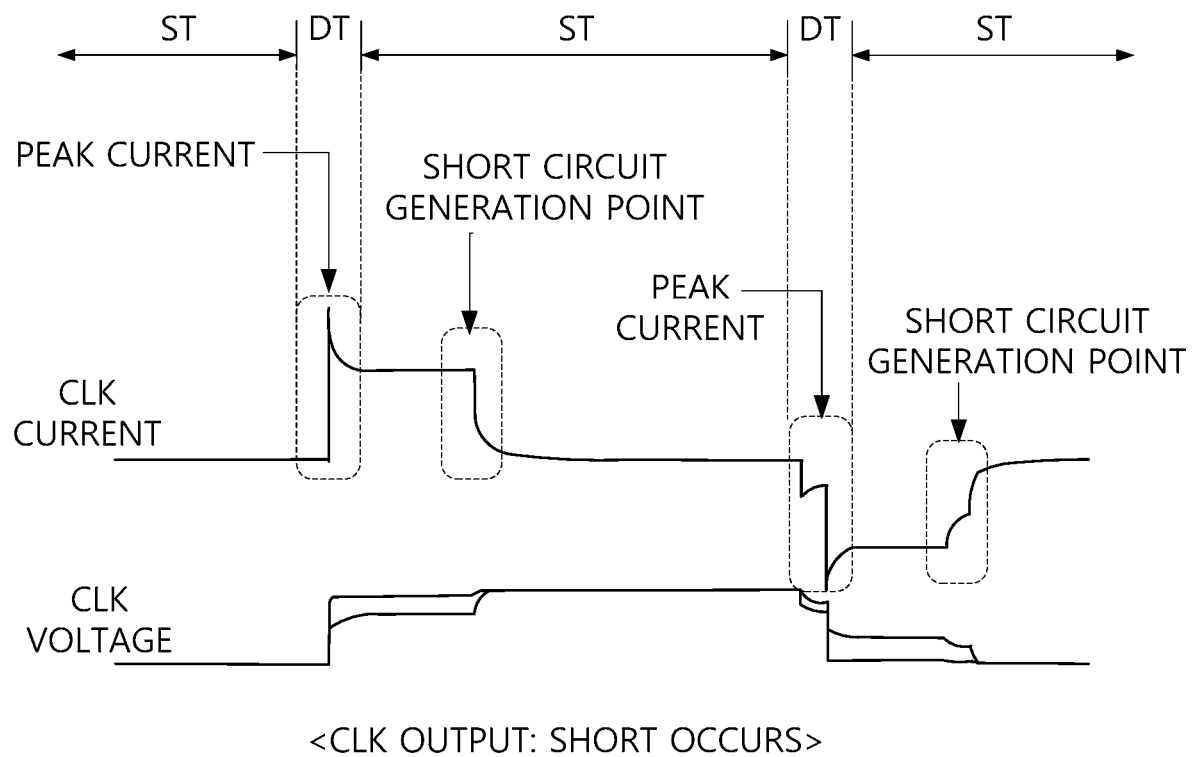

FIG. 4 is a circuit block diagram showing an internal configuration of a level shifter according to an example embodiment of the present disclosure. FIGS. 5A and 5B are simulation waveform diagrams showing a comparison between normal peak current in a non-sensing time period and overcurrent in a sensing time period in a level shifter according to an example embodiment of the present disclosure.

With reference to FIG. 4, the level shifter 600 according to an embodiment of the present disclosure may include a controller 610, an output unit (e.g., circuit) 620, an OCP circuit 630, a non-sensing time period setting unit (e.g., circuit) 640, a counter 650, and so on. The controller 610 may control the output unit 620 using the plurality of simple (or first) timing control signals CSs (e.g., GST, ON_CLK, OFF_CLK, EO, etc.) received from the timing controller 400 and the output unit 620 may include a plurality of output channels for separately generating and outputting the plurality of gate control signals GCSs (e.g., VST, CLK1 to CLKk EVEN, ODD, etc.), levels of which may be shifted, in response to control of the controller 610.

The OCP circuit 630 may include a plurality of OCP circuits that may be separately connected to the plurality of output channels of the output unit 620 and each OCP circuit may sense generation of overcurrent in each output channel to output an OCP signal during overcurrent sensing. The OCP circuit 630 may adjust sensing current and sensing time for sensing overcurrent.

The non-sensing time period setting unit 640 may set a period in which peak current may be generated by a normal gate control signal GCS (e.g., CLK) as a non-sensing time period DT, and may set the remaining periods as a sensing time period ST, as shown in FIGS. 5A and 5B, based on the simple (or first) timing control signals CSs received from the timing controller 400 and the gate control signal GCS received from the output unit 620, which will be described below in detail. The non-sensing time period setting unit 640 may output a non-sensing time period DT signal to the controller 610.

The controller 610 may receive the non-sensing time period DT signal from the non-sensing time period setting unit 640, and may turn off the sensing operation of the OCP circuit 630 during the non-sensing time period DT. The controller 610 may control the OCP circuit 630 along with the output unit 620 to be simultaneously driven during the remaining sensing time period ST, but not during the non-sensing time period DT. Accordingly, as shown in FIG. 5B, the OCP circuit 630 may sense generation of overcurrent, e.g., from a short circuit generation point in a circuit configuration that is directly and indirectly connected to the output unit 620 of the level shifter 600 at each output channel during the sensing time period ST differentiated from the non-sensing time period DT.

The controller 610 may turn off both the output unit 620 and the OCP circuit 630 when overcurrent is sensed at any one channel of the OCP circuit 630 to generate an OCP signal, and the OCP signal may be maintained during OCP setting time. In addition, upon receiving the input gate start pulse GST from the timing controller 400, the controller 610 may again control the output unit 620 and the OCP circuit 630 to normally operate to repeatedly perform a normal output and overcurrent sensing operation.

The counter 650 may count each of a plurality of OCP signals that are separately output from a plurality of channels of the OCP circuit 630 on a frame basis. When a number of times that continuously generated OCP signals are output from any one channel is equal to or greater than a set value (e.g., 3 frames), the counter 650 may supply a shutdown signal SDS to the power supply 500 to block the entire power supply of the power supply 500.

Figure 6:
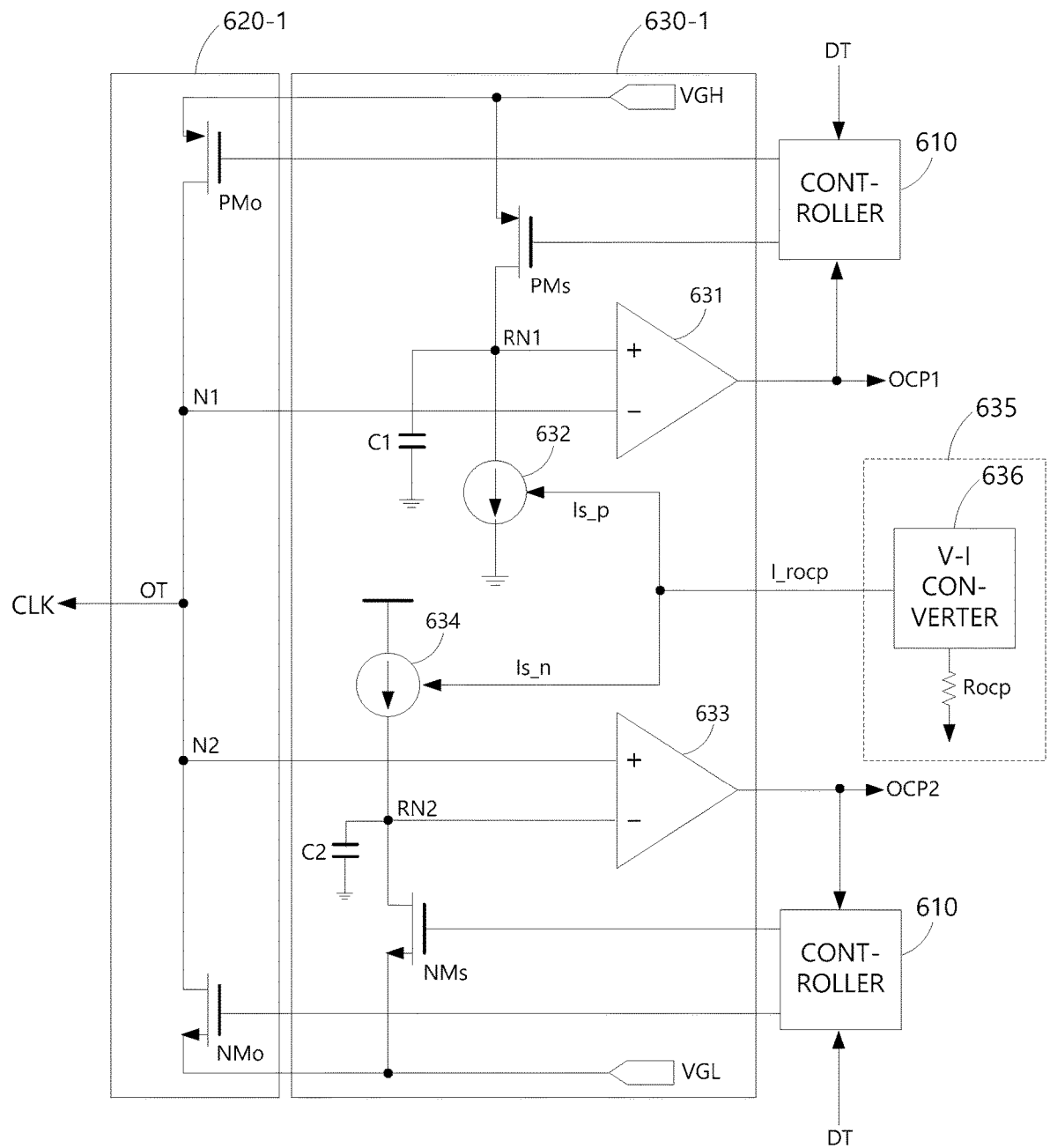
FIG. 6 is an equivalent circuit diagram showing a detailed configuration of any one output channel and an overcurrent protection (OCP) circuit in a level shifter according to an example embodiment of the present disclosure.
Figure 7A:
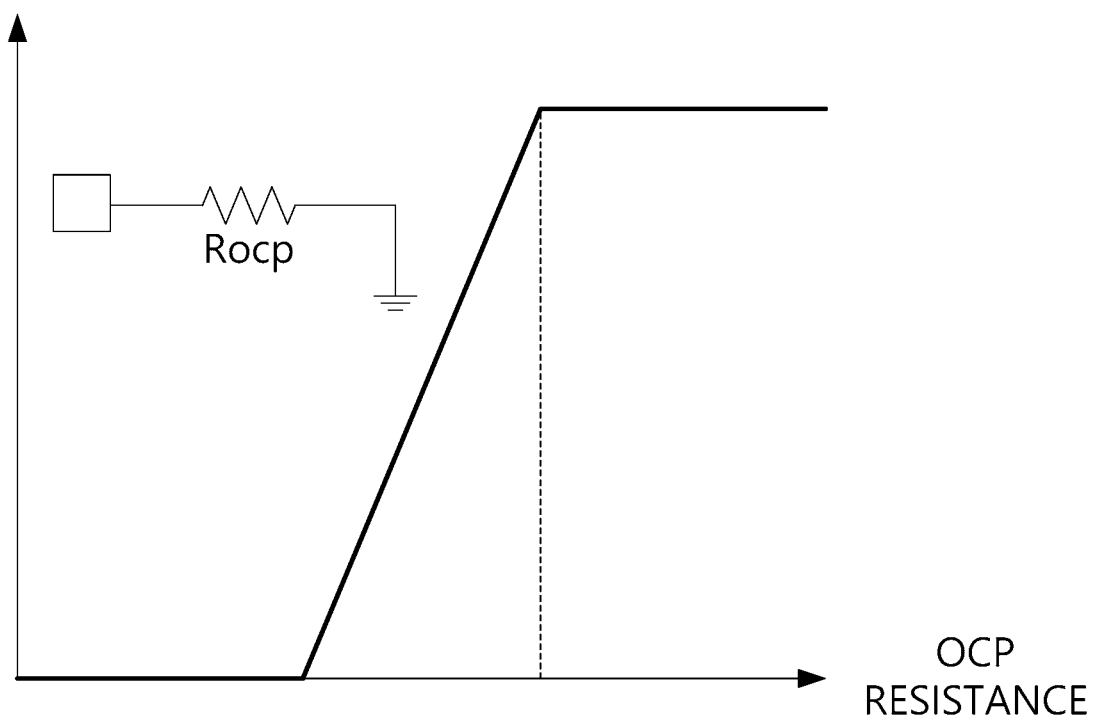
FIGS. 7A and 7B are graphs showing a sensing current setting method and a sensing time setting method of an overcurrent sensing unit (e.g., circuit) according to an example embodiment of the present disclosure.
Figure 7B:
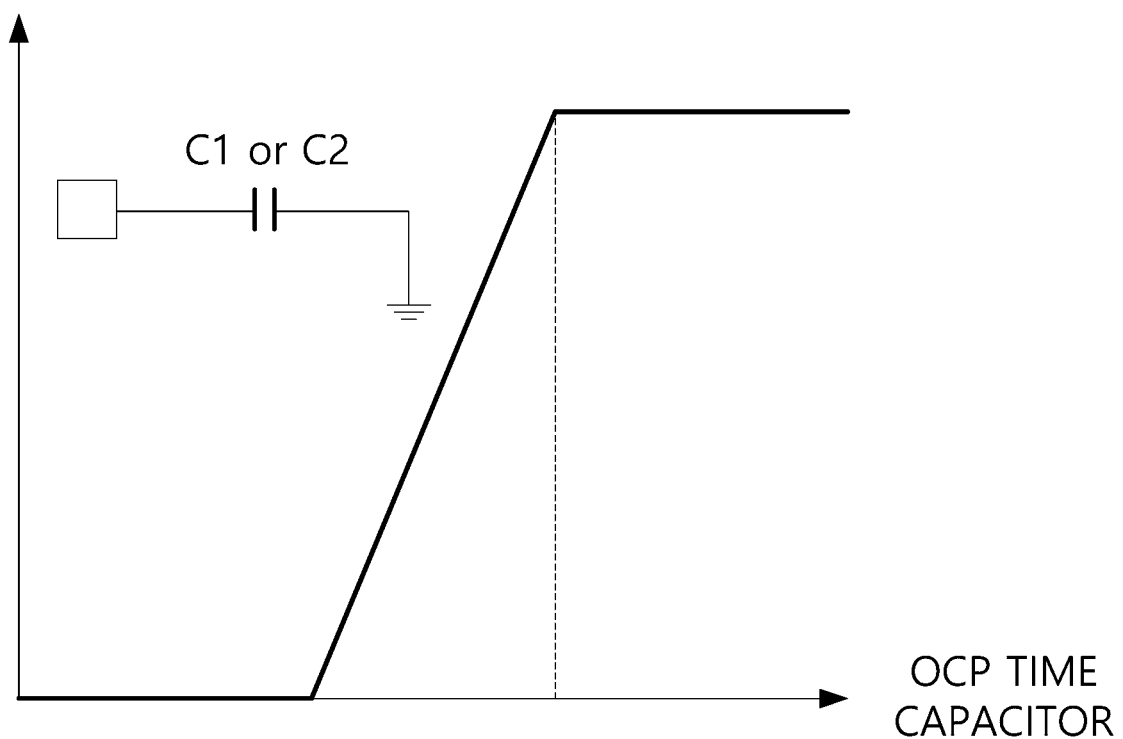

FIG. 6 is an equivalent circuit diagram showing a detailed configuration of any one output channel and an overcurrent protection (OCP) circuit in a level shifter according to an example embodiment of the present disclosure. FIGS. 7A and 7B are graphs showing a sensing current setting method and a sensing time setting method of an overcurrent sensing unit (e.g., circuit) according to an example embodiment of the present disclosure.

FIGS. 7A and 7B show a sensing current setting method and a sensing time setting method of the OCP circuit illustrated in FIG. 6. With reference to FIG. 6, the output unit 620 of the level shifter 600 may include any one output channel 620-1 that may generate and output any one clock CLK in response to control of the controller 610. The OCP circuit 630 may include an OCP circuit 630-1 of any one channel that may be controlled by the controller 610 and connected to any one output channel 620-1.

The output channel 620-1 may include first and second output transistors PMo and NMo that supply the gate high voltage VGH and the gate low voltage VGL to an output terminal OT, respectively, in response to control of the controller 610. The first output transistor PMo may be turned on according to control of the controller 610 to supply the gate high voltage VGH to the output terminal OT. The second output transistor NMo may be turned on according to control of the controller 610 in a different period from the first output transistor PMo to supply the gate low voltage VGL to the output terminal OT. Thus, the output terminal OT may output any one clock CLK, voltage levels of which may be shifted to the gate high voltage VGH and the gate low voltage VGL.

The OCP circuit 630-1 may include first and second sensing transistors PMs and NMs, first and second comparators 631 and 633, first and second current sources 632 and 634, and first and second capacitors C1 and C2. The first and second current sources 632 and 634 may vary current, depending on first and second sensing currents Is_p and Is_n that may each be set by a sensing current adjuster 635, and may generate first and second reference voltages, which correspond to the first and second sensing currents Is_p and Is_n, at first and second reference nodes RN1 and RN2, respectively. The sensing current adjuster 635 may adjust output current of a voltage-current (V-I) converter 636, depending on resistance Rocp, to set the first and second sensing currents Is_p and Is_n, depending on the resistance Rocp, as shown in FIG. 7A. The sensing current adjuster 635 may supply the set first and second sensing currents Is_p and Is_n to the first and second current sources 632 and 634, respectively.

The first sensing transistor PMs may be connected in parallel to the first output transistor PMo and a transmission line of the gate high voltage VGH, and may be connected in series to the first current source 632 through the first reference node RN1. The first sensing transistor PMs may be turned off during the non-sensing time period DT, and may be simultaneously driven, e.g., may be turned-on or turned-off along with the first output transistor PMo during the sensing time period ST, in response to control of the controller 610.

The second sensing transistor NMs may be connected in parallel to the second output transistor NMo and a transmission line of the gate low voltage VGL, and may be connected in series to the second current source 634 through the second reference node RN2. The second sensing transistor NMs may be turned off during the non-sensing time period DT, and may be simultaneously driven, e.g., may be turned-on or turned-off along with the second output transistor NMo during the sensing time period ST, in response to control of the controller 610.

An inverting (−) terminal of the first comparator 631 may be connected to a first output node N1 of the first output transistor PMo, and a non-inverting (+) terminal may be connected to the first reference node RN1 connected to the first sensing transistor PMs. The first comparator 631 may output a first OCP signal (hereinafter referred to as an OCP1 signal) when overcurrent equal to or greater than the first sensing current Is_p is generated during the sensing time period ST in which the first sensing transistor PMs is turned on in a time period in which the first output transistor PMo is turned on to output the gate high voltage VGH.

For example, the first comparator 631 may sense when overcurrent is generated in a circuit configuration that is directly and indirectly connected to the output terminal OT and a voltage of the first output node N1 is reduced as compared with a first reference voltage of the first reference node RN1, determined by the first sensing current Is_p, during the sensing time period ST in a time period in which the output terminal OT outputs the gate high voltage VGH, and may output the OCP1 signal. As shown in FIG. 7B, the overcurrent sensing time period of the first comparator 631 may be determined by capacitance of a first capacitor C1 that may be connected in parallel to the first reference node RN1.

A non-inverting (+) terminal of the second comparator 633 may be connected to a second output node N2 of the second output transistor NMo, and an inverting (−) terminal may be connected to the second reference node RN2 connected to the second sensing transistor NMs. The second comparator 633 may output a second OCP signal (hereinafter referred to as an OCP2 signal) when overcurrent equal to or less than the second sensing current Is_n is generated during the sensing time period ST in which the second sensing transistor NMs is turned on in a time period in which the second output transistor NMo is turned on to output the gate low voltage VGL.

For example, the second comparator 633 may sense when overcurrent is generated in a circuit configuration that is directly and indirectly connected to the output terminal OT and a voltage of the second node N2 is increased as compared with a second reference voltage of the second reference node RN2, determined by the second sensing current Is_n, during the sensing time period ST in a time period in which the output terminal OT outputs the gate low voltage VGL, and may output the OCP2 signal. As shown in FIG. 7B, the overcurrent sensing time period of the second comparator 633 may be determined by capacitance of a second capacitor C2 that is connected in parallel to the second reference node RN2.

Figure 8A:
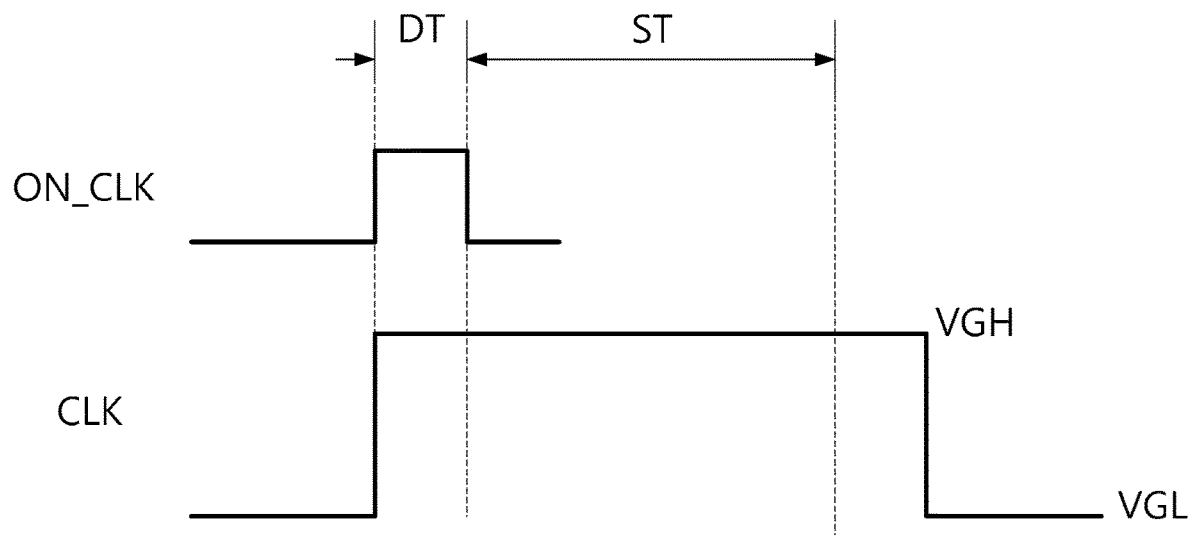
FIGS. 8A and 8B are waveform diagrams showing a method of setting a non-sensing time period by a level shifter according to an example embodiment of the present disclosure.
Figure 8B:
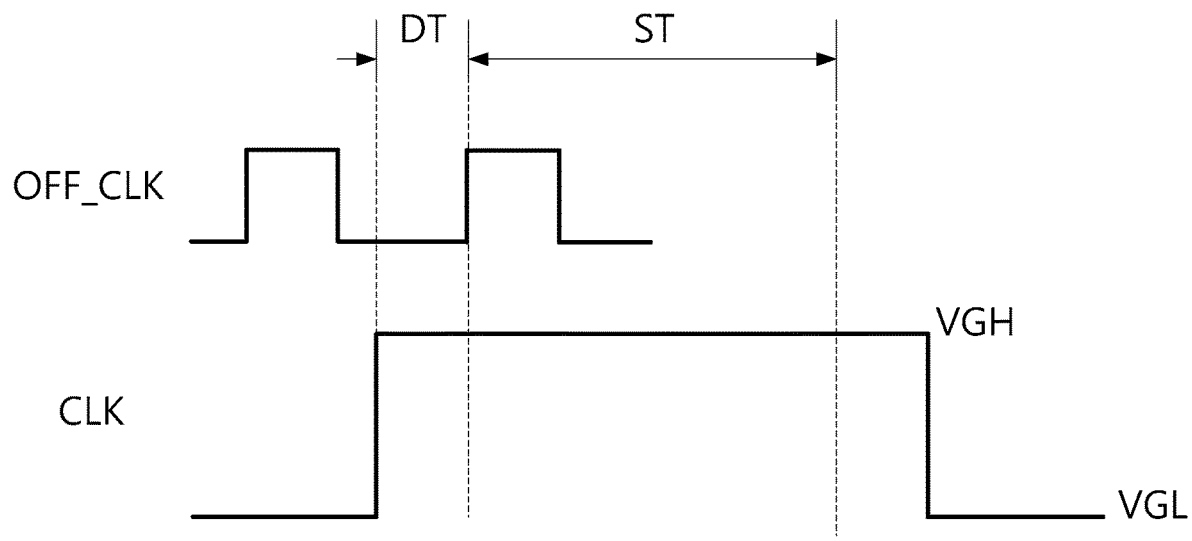
Figure 9A:
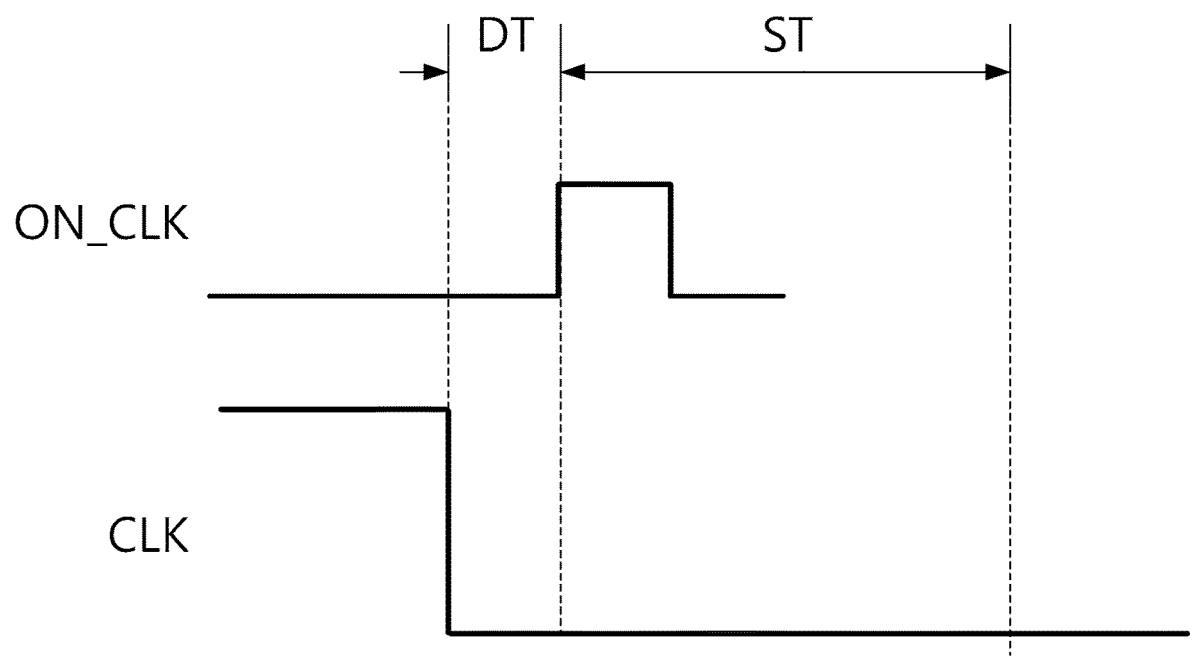
FIGS. 9A and 9B are waveform diagrams showing a method of setting a non-sensing time period by a level shifter according to an example embodiment of the present disclosure.
Figure 9B:
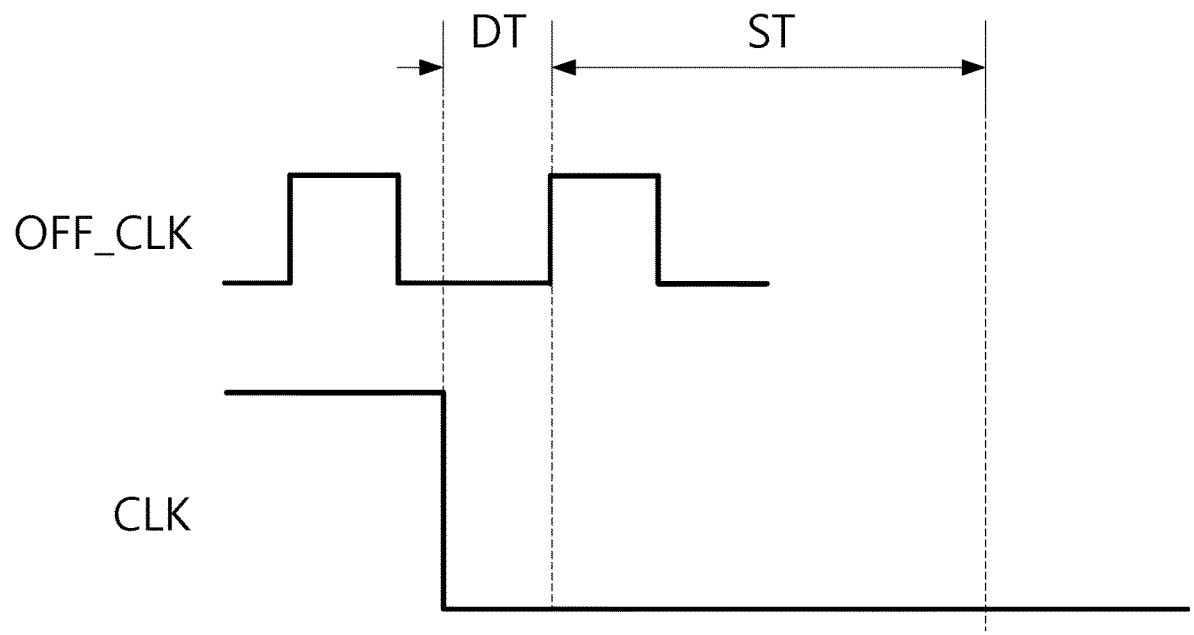
Figure 10:
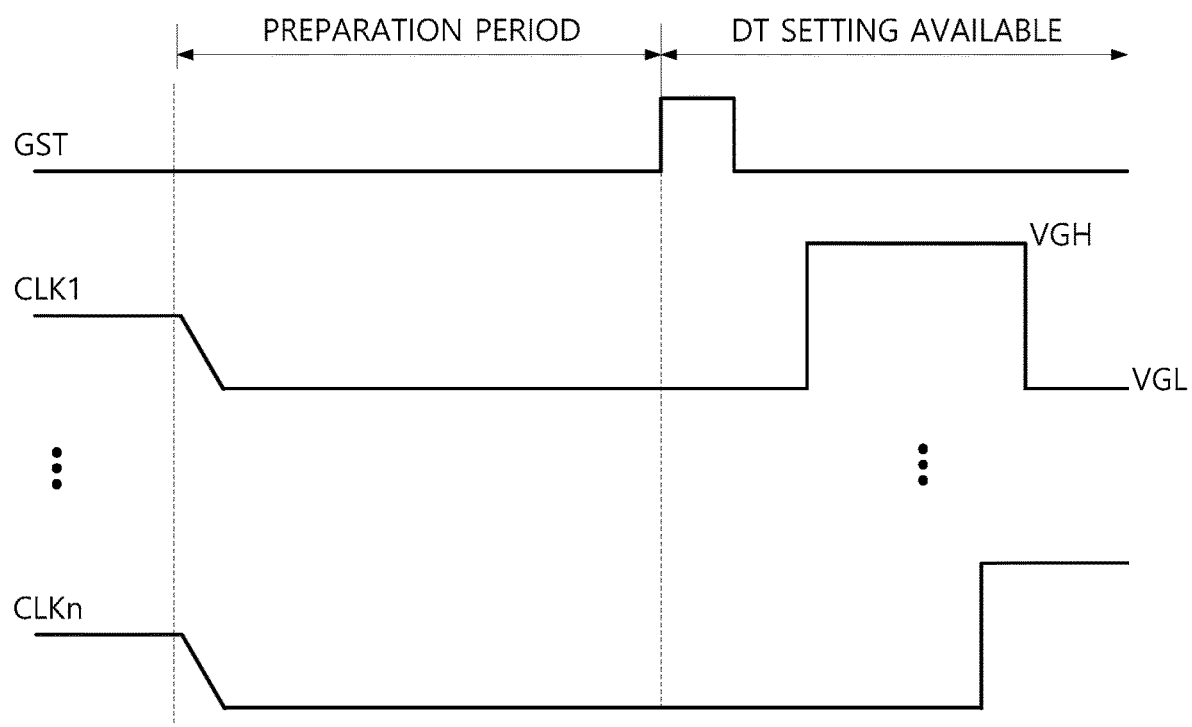
FIG. 10 is a waveform diagram showing a method of setting a non-sensing time period by a level shifter according to an example embodiment of the present disclosure.

FIGS. 8A and 8B are waveform diagrams showing a method of setting a non-sensing time period by a level shifter according to an example embodiment of the present disclosure. FIGS. 9A and 9B are waveform diagrams showing a method of setting a non-sensing time period by a level shifter according to an example embodiment of the present disclosure. FIG. 10 is a waveform diagram showing a method of setting a non-sensing time period by a level shifter according to an example embodiment of the present disclosure.

FIGS. 8A to 10 show a method of setting a non-sensing time period by the level shifter in various ways according to an embodiment of the present disclosure. With reference to FIGS. 8A and 8B, the non-sensing time period setting unit 640 illustrated in FIG. 4 may set a peak current generation period via normal driving to the non-sensing time period DT using on clock ON_CLK and off clock OFF_CLK received from the timing controller 400 and each clock CLK received from the output unit 620.

The non-sensing time period setting unit 640 may set a time period to an earlier edge of a falling edge of on clock ON_CLK and a rising edge of off clock OFF_CLK from a rising edge of each clock CLK to the non-sensing time period DT. For example, as shown in FIG. 8A, when a falling edge of on clock ON_CLK is generated earliest after a rising edge of each clock CLK, a time period to a falling edge of on clock ON_CLK from a rising edge of each clock CLK may be set to be the non-sensing time period DT. As shown in FIG. 8B, when a rising edge of off clock OFF_CLK is generated earliest after a rising edge of each clock CLK, a time period to a rising edge of off clock OFF_CLK from a rising edge of each clock CLK may be set to be the non-sensing time period DT.

The controller 610 may turn off a sensing operation of the OCP circuit 630 during the non-sensing time period DT received from the non-sensing time period setting unit 640, and may turn on the sensing operation of the OCP circuit 630 during the remaining periods, except for the non-sensing time period DT. The OCP circuit 630 may sense whether overcurrent is generated during the sensing time period ST that may be determined based on the capacitance of the capacitors C1 and C2.

With reference to FIGS. 9A and 9B, the non-sensing time period setting unit 640 illustrated in FIG. 4 may set a peak current generation period via normal driving to the non-sensing time period DT using on clock ON_CLK and off clock OFF_CLK received from the timing controller 400 and each clock CLK received from the output unit 620. The non-sensing time period setting unit 640 may set a time period to an earlier edge of a rising edge of on clock ON_CLK and a rising edge of off clock OFF_CLK from a falling edge of each clock CLK to the non-sensing time period DT.

For example, as shown in FIG. 9A, when a rising edge of on clock ON_CLK is generated earliest after a falling edge of each clock CLK, a time period to a rising edge of on clock ON_CLK from a falling edge of the clock CLK may be set to be the non-sensing time period DT. As shown in FIG. 9B, when a rising edge of the off clock OFF_CLK is generated earliest after a falling edge of each clock CLK, a time period to a rising edge of the gate start pulse GST from a falling edge of the clock CLK may be set to be the non-sensing time period DT.

The controller 610 may turn off a sensing operation of the OCP circuit 630 during the non-sensing time period DT. The controller 610 may turn on the sensing operation of the OCP circuit 630 during the remaining periods, except for the non-sensing time period DT. The OCP circuit 630 may sense whether overcurrent is generated during the sensing time period ST that may be determined based on the capacitance of the capacitors C1 and/or C2. As seen from FIG. 10, it may be impossible to set the non-sensing time period DT described with reference to FIGS. 8A to 9B in a preparation period prior to input of the gate start pulse GST, on clock ON_CLK, and off clock OFF_CLK from the timing controller 400 after power on of the power supply 500.

Accordingly, the controller 610 may turn on the sensing operation of the OCP circuit 630 to monitor generation of overcurrent without the non-sensing time period DT prior to input of the gate start pulse GST after power on and monitor whether the OCP signal is generated by overcurrent sensing at any one of a plurality of channels. The controller 610 may determine that overcurrent is generated, e.g., due to a short circuit, and may output a shutdown signal to the power supply 500 to block power supply when an OCP signal is generated at any one channel and, then, may be generated again after a sensing time period set by the capacitors C1 and/or C2.

Output of the level shifter 600 and the gate driver 200 may not be generated in a preparation period shown in FIG. 10. Thus, generation of overcurrent, e.g., due to a short circuit at a printed circuit board (PCB), etc. connected to the level shifter 600, may be sensed.

As described above, a level shifter of a display device according to an embodiment of the present disclosure may sense a time period in which peak current via a normal output signal is generated, to a non-sensing time period, to differentially sense abnormal overcurrent generated during a sensing time period, except for the non-sensing time period, from normal peak current generated during the non-sensing time period.

The level shifter of the display device according to an embodiment of the present disclosure may sense overcurrent generated in other components electrically connected to the level shifter, e.g., a gate driver, a printed circuit board (PCB), etc., as well as overcurrent generated in the display device to protect the entire display device.

The level shifter of the display device according to an embodiment of the present disclosure may supply a shutdown signal to a power supply to block power supply when a number of times that an OCP signal is generated is equal to or greater than a set value to protect the entire display device from generation of overcurrent. As a result, a panel may be prevented from combusting or igniting due to generation of overcurrent in a built-in gate driver or the panel and image quality costs for prevention of combustion and ignition of the panel may be reduced.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display device, comprising:
a timing controller configured to generate and supply a plurality of first timing control signals;
a level shifter configured to generate and supply a plurality of gate control signals using the plurality of first timing control signals received from the timing controller;
a gate driver configured to separately drive gate lines of a panel using the plurality of gate control signals received from the level shifter; and
an output circuit configured to output of the plurality of gate control signals,
wherein the level shifter comprises:
an overcurrent protection circuit connected to the output circuit, the overcurrent protection circuit being configured to sense overcurrent generation in the level shifter and overcurrent generation in a target circuit, directly or indirectly connected to the level shifter, through the output circuit to output an overcurrent protection signal,
a controller configured to control the output circuit to generate and output the plurality of gate control signals using a plurality of simple timing control signals, and
a non-sensing time period setting circuit configured to set the non-sensing time period using at least one of the plurality of simple timing control signals and at least one of the plurality of gate control signals, wherein the level shifter is further configured to:
    set a time period in which normal peak current is generated by output of each of the plurality of gate control signals, to be a non-sensing time period,
    turn off a sensing operation of the overcurrent protection circuit during the non-sensing time period, and
    turn on the sensing operation of the overcurrent protection circuit during remaining periods, except for the non-sensing time period,
wherein the overcurrent protection circuit is further configured to:
    turn on the sensing operation, and
    sense the overcurrent generation during a predetermined sensing time period,
    wherein the output circuit comprises a plurality of output channels configured to output the plurality of gate control signals, respectively according to control of the controller, and
    wherein the overcurrent protection circuit comprises a plurality of channels that are separately connected to the plurality of output channels and sense the overcurrent generation through a corresponding output channel.

2. The display device of claim 1 wherein the controller is further configured to:
    turn off both the output circuit and an overcurrent sensing circuit when an overcurrent protection circuit of any one of the plurality of channels outputs the overcurrent protection signal and output of the overcurrent protection is maintained during a setting period; and
    upon receiving a gate start pulse from the timing controller, control the output circuit and the overcurrent sensing circuit to normally operate.

3. The display device of claim 2, wherein the level shifter further comprises a counter configured to output a shutdown signal to a power supply to allow the power supply to block input of a power supply when a number of times that the overcurrent protection signal is output from any one of the plurality of channels of the overcurrent protection circuit is equal to or greater than a set value.

4. The display device of claim 2, wherein:
    each of the output channels comprises:
        a first output transistor configured to output a gate high voltage to an output terminal, in response to control of the controller; and
        a second output transistor configured to output a gate low voltage to the output terminal, in response to control of the controller; and
    the overcurrent protection circuit of each of the channels comprises:
        a first sensing transistor connected in parallel to the first output transistor;
        a second sensing transistor connected in parallel to the second output transistor;
        a first comparator configured to compare a first reference voltage generated from a first reference node connected between the first sensing transistor and a first current source with a first output node voltage of the first output transistor to output a first overcurrent protection signal according to a comparison result; and
        a second comparator configured to compare a second reference voltage generated from a second reference node connected between the second sensing transistor and a second current source with a second output node voltage of the second output transistor to output a second overcurrent protection signal according to a comparison result.

5. The display device of claim 4, wherein the controller is further configured to:
    according to respective corresponding control signals during the non-sensing time period:
        turn off the first and second sensing transistors; and
        turn on or turn off the first and second output transistors; and
    during periods other than the non-sensing time period:
        simultaneously control the first output transistor and the first sensing transistor; and
        simultaneously control the second output transistor and the second sensing transistor.

6. The display device of claim 4, wherein the overcurrent protection circuit further comprises:
    a first capacitor connected in parallel to the first reference node, and configured to set a sensing time period of the first comparator;
    a second capacitor connected in parallel to the second reference node, and configured to set a sensing time period of the first comparator; and
    a sensing current setting configured to:
        adjust output current of a voltage-current converter, based on a resistance, to sense each of first and second sensing currents;
        vary current of the first current source based on the first sensing current; and
        vary current of the second current source based on the second sensing current.

7. The display device of claim 1, wherein the non-sensing time period setting circuit is further configured to set the non-sensing time period using a gate start pulse received from the timing controller, a on clock, an off clock, and each of a plurality of clocks received from the output circuit.

8. The display device of claim 7, wherein the non-sensing time period setting circuit is further configured to:
    set a time period to an earlier edge of a falling edge of the on clock and a rising edge of the off clock from a rising edge of any one of the plurality of clocks, to be the non-sensing time period; or
    set a time period to an earlier edge of a rising edge of the on clock and a rising edge of the off clock from a falling edge of any one of the plurality of clocks, to be the non-sensing time period.

9. The display device of claim 8, wherein the controller is further configured to:
    turn on a sensing operation of the overcurrent protection circuit without the non-sensing time period prior to input of the gate start pulse after power on; and
    output a shutdown signal to a power supply when the overcurrent protection signal is generated from any one of the plurality of channels of the overcurrent protection circuit and the overcurrent protection signal is generated again from any one of the plurality of channels.

10. The display device of claim 1, wherein the level shifter is further configured to sense the overcurrent generation from at least one of a gate driver connected to the level shifter and installed in the panel and a printed circuit board connected to the level shifter.

11. A method of operating a display device, the method comprising:
    by a timing controller, generating and supplying a plurality of first timing control signals;

by a level shifter, generating and supplying a plurality of gate control signals using the plurality of first timing control signals received from the timing controller;

by a gate driver, separately driving gate lines of a panel using the plurality of gate control signals received from the level shifter; and by an output circuit, outputting the plurality of gate control signals, wherein the level shifter comprises:
- an overcurrent protection circuit connected to the output circuit, the overcurrent protection circuit sensing overcurrent generation in the level shifter and overcurrent generation in a target circuit, directly or indirectly connected to the level shifter, through the output circuit to output an overcurrent protection signal,
- a controller that controls the output circuit to generate and output the plurality of gate control signals using a plurality of simple timing control signals, and
- a non-sensing time period setting circuit that sets the non-sensing time period using at least one of the plurality of simple timing control signals and at least one of the plurality of gate control signals, by the level shifter:
- setting a time period in which normal peak current is generated by output of each of the plurality of gate control signals, to be a non-sensing time period,
- turning off a sensing operation of the overcurrent protection circuit during the non-sensing time period, and
- turning on the sensing operation of the overcurrent protection circuit during remaining periods, except for the non-sensing time period, and by the overcurrent protection circuit:
- turning on the sensing operation, and
- sensing the overcurrent generation during a predetermined sensing time period,
- wherein the output circuit comprises a plurality of output channels configured to output the plurality of gate control signals, respectively according to control of the controller, and
- wherein the overcurrent protection circuit comprises a plurality of channels that are separately connected to the plurality of output channels and sense the overcurrent generation through a corresponding output channel.

12. The method of claim 11, further comprising, by the controller:
- turning off both the output circuit and an overcurrent sensing circuit when an overcurrent protection circuit of any one of the plurality of channels outputs the overcurrent protection signal and output of the overcurrent protection is maintained during a setting period; and
- upon receiving a gate start pulse from the timing controller, controlling the output circuit and the overcurrent sensing circuit to normally operate.

13. The method of claim 12, wherein the level shifter further comprises a counter that outputs a shutdown signal to a power supply to allow the power supply to block input of a power supply when a number of times that the overcurrent protection signal is output from any one of the plurality of channels of the overcurrent protection circuit is equal to or greater than a set value.

14. The method of claim 12, wherein:
each of the output channels comprises:
- a first output transistor that outputs a gate high voltage to an output terminal, in response to control of the controller; and
- a second output transistor that outputs a gate low voltage to the output terminal, in response to control of the controller; and the overcurrent protection circuit of each of the channels comprises:
- a first sensing transistor connected in parallel to the first output transistor;
- a second sensing transistor connected in parallel to the second output transistor;
- a first comparator configured that compares a first reference voltage generated from a first reference node connected between the first sensing transistor and a first current source with a first output node voltage of the first output transistor to output a first overcurrent protection signal according to a comparison result; and
- a second comparator configured that compares a second reference voltage generated from a second reference node connected between the second sensing transistor and a second current source with a second output node voltage of the second output transistor to output a second overcurrent protection signal according to a comparison result.

15. The method of claim 14, further comprising, by the controller:
according to respective corresponding control signals during the non-sensing time period:
- turning off the first and second sensing transistors; and
- turning on or turning off the first and second output transistors; and during periods other than the non-sensing time period:
- simultaneously controlling the first output transistor and the first sensing transistor; and
- simultaneously controlling the second output transistor and the second sensing transistor.

16. The method of claim 14, wherein the overcurrent protection circuit further comprises:
- a first capacitor connected in parallel to the first reference node, that sets a sensing time period of the first comparator;
- a second capacitor connected in parallel to the second reference node, that sets a sensing time period of the first comparator; and
- a sensing current setting that:
  - adjusts output current of a voltage-current converter, based on a resistance, to sense each of first and second sensing currents;
  - varies current of the first current source based on the first sensing current; and
  - varies current of the second current source based on the second sensing current.

17. The method of claim 11, further comprising, by the non-sensing time period setting circuit, setting the non-sensing time period using a gate start pulse received from the timing controller, a on clock, an off clock, and each of a plurality of clocks received from the output circuit.

18. The method of claim 17, further comprising, by the non-sensing time period setting circuit:
- setting a time period to an earlier edge of a falling edge of the on clock and a rising edge of the off clock from a rising edge of any one of the plurality of clocks, to be the non-sensing time period; or
- setting a time period to an earlier edge of a rising edge of the on clock and a rising edge of the off clock from a falling edge of any one of the plurality of clocks, to be the non-sensing time period.

19. The method of claim 18, further comprising, by the controller:
turning on a sensing operation of the overcurrent protection circuit without the non-sensing time period prior to input of the gate start pulse after power on; and
outputting a shutdown signal to a power supply when the overcurrent protection signal is generated from any one of the plurality of channels of the overcurrent protection circuit and the overcurrent protection signal is generated again from any one of the plurality of channels.

20. The method of claim 11, by the level shifter, sensing the overcurrent generation from at least one of a gate driver connected to the level shifter and installed in the panel and a printed circuit board connected to the level shifter.

* * * * *